(12) United States Patent
Bayne

(10) Patent No.: US 8,768,829 B2
(45) Date of Patent: Jul. 1, 2014

(54) SYSTEM AND METHOD FOR PROVIDING TRANSACTIONAL CREDIT

(76) Inventor: Anthony Jeremiah Bayne, Lomita, CA (US)

( * ) Notice: Subject to any disclaimer, the term of this patent is extended or adjusted under 35 U.S.C. 154(b) by 1354 days.

(21) Appl. No.: 12/266,552

(22) Filed: Nov. 7, 2008

(65) Prior Publication Data
US 2010/0005023 A1    Jan. 7, 2010

Related U.S. Application Data

(60) Provisional application No. 61/082,186, filed on Jul. 18, 2008, provisional application No. 61/078,402, filed on Jul. 6, 2008.

(51) Int. Cl.
*G06Q 40/00* (2012.01)
*G06Q 20/10* (2012.01)
*G06Q 40/02* (2012.01)

(52) U.S. Cl.
CPC ............. *G06Q 40/02* (2013.01); *G06Q 20/10* (2013.01)
USPC .................. 705/39; 705/35; 705/40; 705/26; 705/17; 705/16; 235/380; 235/379

(58) Field of Classification Search
USPC ........ 705/30–45, 17, 16; 726/4; 235/379, 380
See application file for complete search history.

(56) References Cited

U.S. PATENT DOCUMENTS

| | | | |
|---|---|---|---|
| 5,864,830 A * | 1/1999 | Armetta et al. | 705/41 |
| 6,820,802 B2 * | 11/2004 | Biggar et al. | 235/379 |
| 7,512,566 B1 * | 3/2009 | Fellner | 705/67 |
| 7,882,028 B1 * | 2/2011 | Devine et al. | 705/39 |
| 8,027,888 B2 * | 9/2011 | Chandran et al. | 705/30 |
| 8,306,907 B2 * | 11/2012 | Das | 705/38 |
| 2001/0034720 A1 * | 10/2001 | Armes | 705/65 |
| 2002/0174016 A1 * | 11/2002 | Cuervo | 705/16 |
| 2003/0041021 A1 * | 2/2003 | Kogler et al. | 705/38 |
| 2003/0046222 A1 * | 3/2003 | Bard et al. | 705/38 |
| 2003/0097270 A1 * | 5/2003 | Musselwhite et al. | 705/1 |
| 2003/0229585 A1 * | 12/2003 | Butler | 705/39 |
| 2004/0024703 A1 * | 2/2004 | Roskind | 705/40 |
| 2004/0155101 A1 * | 8/2004 | Royer et al. | 235/379 |
| 2004/0236682 A1 * | 11/2004 | Strayer et al. | 705/39 |
| 2005/0086167 A1 * | 4/2005 | Brake et al. | 705/41 |
| 2005/0149455 A1 * | 7/2005 | Bruesewitz et al. | 705/64 |
| 2007/0005464 A1 * | 1/2007 | Rosenblatt et al. | 705/35 |
| 2007/0284436 A1 * | 12/2007 | Gland | 235/380 |
| 2007/0299756 A1 * | 12/2007 | Clearly et al. | 705/35 |

\* cited by examiner

*Primary Examiner* — Tien Nguyen

(57) ABSTRACT

System and method for a second credit card issuer to provide transactional credit to a credit cardholder of a first credit card issuer, when the cardholder's account with the first issuer is in good standing and has an available credit balance equal to, or greater than, a proposed financial transaction with a merchant who does not accept the credit card of the first issuer, but does accept the credit card of the second issuer. The second issuer may charge a convenience fee to the customer, merchant, first credit card issuer, or any combination of them, for providing the transactional credit. Additionally, the second issuer may provide transactional credit to a customer to complete a financial transaction, via a reactivated credit card account of the second issuer, when the customer has a closed credit card account of the second credit card issuer that was closed in good standing.

17 Claims, 3 Drawing Sheets

US 8,768,829 B2

SYSTEM AND METHOD FOR PROVIDING TRANSACTIONAL CREDIT

RELATED APPLICATIONS

This application is based on and claims priority to U.S. Provisional Patent Application No. 61/082,186, filed Jul. 17, 2008, and U.S. Provisional Patent Application No. 61/078,402, filed Jul. 6, 2008, the entire disclosures of each are hereby incorporated by reference.

BACKGROUND OF THE INVENTION

1. Field of the Invention

The present application relates to a transactional credit system and method, more particularly to a system and method for a second credit card issuer to provide transactional credit to a cardholder customer of a first credit card issuer to complete a financial transaction, that is not a cardholder customer of the second credit card issuer.

2. Background

Many merchants allow consumers to make purchases and payments (collectively "financial transactions") using credit cards. Bankcard associations set interchange rates that are collected as a percentage of a transaction amount for each credit card transaction at the credit card's applicable rate. An acquiring bank (i.e. a financial institution that contracts with a merchant to provide a credit card processing account and settle electronic transactions) sends credit card transaction and purchase information to a the bankcard association, who then forwards a portion of that revenue to the credit card issuer. The merchant's acquiring bank is charged the interchange rate for a consumer transaction by the card association.

Since interchange rates vary, a merchant may accept the credit card of one card association, but not another, based at least in part on the interchange rate levied by the card association for credit card transactions.

Customers are interested in having their credit cards accepted for payment, and are usually not concerned about the merchant's costs or expenses. For example, when a merchant only accepts the Credit Card of credit card Issuer Number Two (hereinafter "Issuer #2"), the merchant may lose a sale if the customer only has a credit card of Credit Card Issuer Number One (hereinafter "Issuer #1"). This is true even when the customer's credit card from Issuer #1 is a "major credit card", the customer's credit card account is in good standing, and the credit card's available balance is sufficient to otherwise complete the financial transaction.

Therefore, a need exists to provide transactional credit from Issuer #2, to a credit cardholder customer of Issuer #1, who does not have a credit card account of Issuer #2, when a merchant accepts the credit card of Issuer #2, but does not accept the credit card of Issuer #1. The term "transactional credit" includes an amount of credit sufficient to complete a single proposed financial transaction, including any additional fee (e.g. convenience fee, transaction fee, etc.) that may be charged for providing the transactional credit.

Additionally, many consumers close credit card accounts when they believe that they will not need the credit card any longer. However, it happens sometimes that these consumers may "max out" their remaining open credit card(s) (i.e. use all the available credit on a particular credit card), or need a particular issuer's credit card to complete a credit purchase. Therefore a need remains to reactivate a consumer's closed credit card account, that a merchant will accept, to complete a financial transaction, when the account was closed in good standing.

SUMMARY OF CERTAIN INVENTIVE ASPECTS

The present invention solves the above described problems and provides a distinct advance in the art of qualifying and providing transactional credit to a customer who wants to complete a purchase or make a payment.

In one embodiment, the invention provides for a method for providing transactional credit to complete a financial transaction, the method comprising, presenting a credit card of a first credit card issuer to a merchant by a customer to complete a financial transaction, requesting transactional credit from a second credit card issuer to complete the financial transaction, when a merchant does not accept the credit card of a first credit card issuer, authorizing transactional credit from the second credit card issuer, and using the transactional credit to complete the financial transaction.

In another embodiment, the invention provides for a system to provide transactional credit, comprising, means to present a credit card of a first credit card issuer by a customer to a merchant to complete a financial transaction, means to request transactional credit from a second credit card issuer whose credit card the merchant accepts, when the merchant does not accept the credit card of the first credit card issuer, means to authorize transactional credit from the second credit card issuer, and means to complete the financial transaction.

In another embodiment, the invention provides for a method of providing transactional credit via a reactivated credit card account to complete a financial transaction, comprising determining whether a credit card of a first credit card issuer, presented by a customer to a merchant to complete a financial transaction, is in good standing, when a merchant does not accept the credit card of the first issuer, determining whether the customer had a credit card of a second issuer that was closed while in good standing, when the merchant accepts the credit card of the second issuer, authorizing transactional credit for the customer in the form of a reactivated credit card of the second credit card issuer, when the customer's credit card of the first issuer is in good standing and the customer has a closed credit card account of the second issuer that was closed in good standing, and completing the financial transaction.

Other aspects and advantages of the present invention will be apparent from the following detailed description of the preferred embodiments and the accompanying drawing figures.

BRIEF DESCRIPTION OF THE DRAWINGS

The present application can be more fully understood by reading the following detailed description of the presently preferred embodiments together with the accompanying drawings, in which.

DETAILED DESCRIPTION OF CERTAIN EMBODIMENTS

Figure 1:
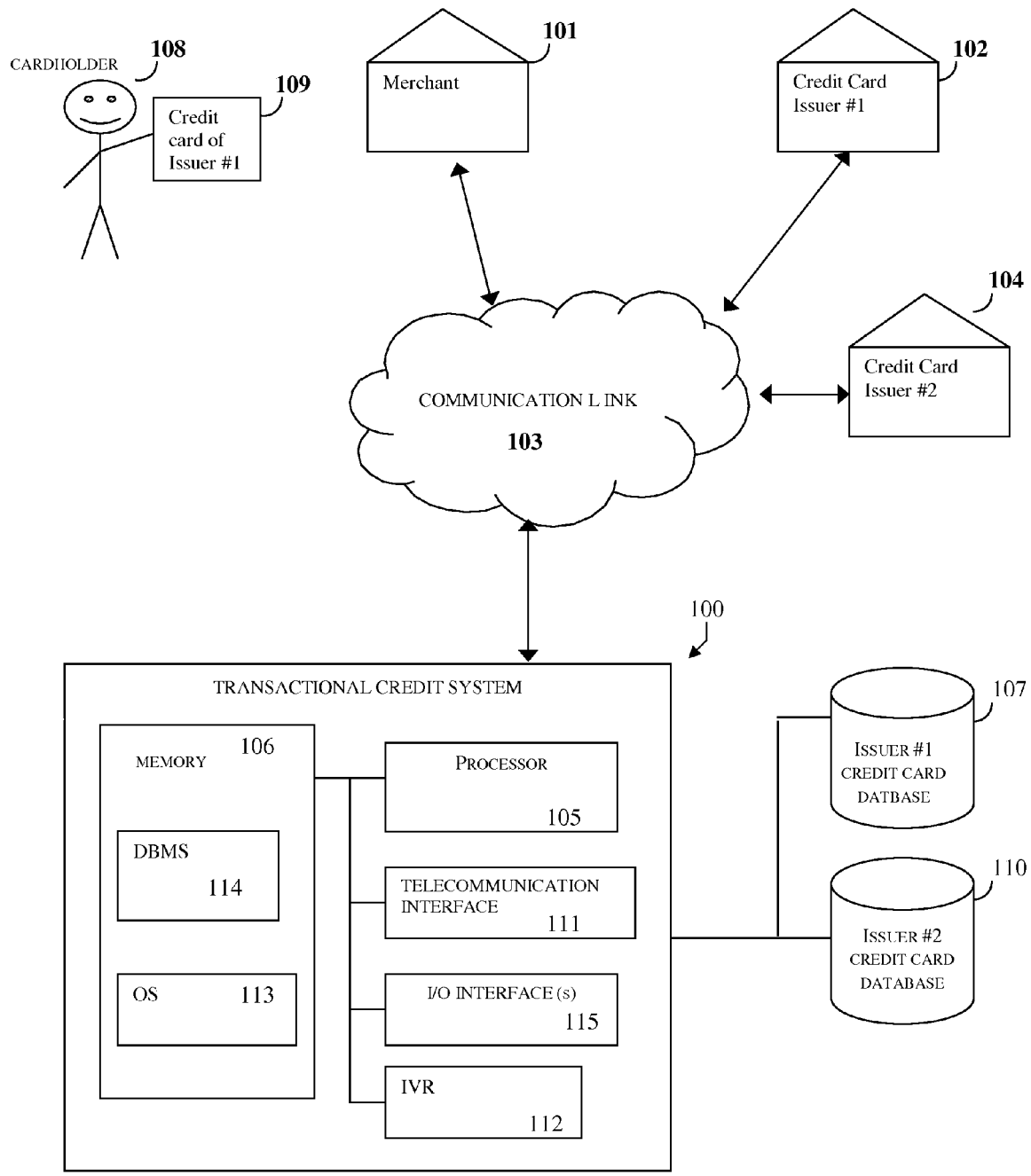
FIG. 1 illustrates an exemplary operating environment for a transactional credit system according to the exemplary embodiments of the present application.

Exemplary embodiments of the present invention will hereinafter be described with reference to the figures, in which like numerals indicate like elements throughout the several drawings. FIG. 1 is a block diagram illustrating an exemplary operating environment for implementation of certain embodiments of the present invention. The exemplary operating environment includes a Transactional Credit System (TCS) 100 that is in communication, via a communication link 103, with at least one merchant 101 and at least one credit card issuer (e.g. Issuer #2) 104 whose credit card is accepted by the merchant 101. The communication link 103 connects the TCS 100, the merchant 101 and Issuer #2 104. In certain embodiments, a dedicated communication link, such as a tie-line, may connect the merchant 101 to the TCS 100.

The communication link 103 may be any public and/or private communication network. In certain embodiments, the communication link 103 is the Public Switched Telephone Network (PSTN). The communication link 103 may include wired and/or wireless segments, and may carry digital and/or analog signals. In alternate embodiments, the communication link 103 may take other forms, such as a voice over IP network or other type of data network. The various components and functionality of typical communication links, as well as proprietary credit networks (e.g. VisaNet®), for transmitting data, authorizing and processing credit transactions are well known in the art, and are therefore not described in detail herein.

Issuer #2 104 may communicate with a first credit card issuer (i.e. Issuer#1 102), whose credit card the merchant 101 does not accept, using a communication link (not shown) other than the communication link 103 shared with the merchant 101.

In a preferred embodiment, Issuer #1 communicates with the merchant 101 indirectly via Issuer #2 104. In an alternate embodiment, Issuer #2 104 and Issuer #1 102 may communicate directly with the merchant 101, and each other, via the communication link 103.

The environment includes a customer credit card holder 108 (hereinafter "cardholder") who has a credit card 109 of Issuer #1 102, but not of Issuer #2 104. The cardholder 108 wishes to make a purchase from the merchant 101 who does not accept the credit card 109 of Issuer #1 102. However, the merchant 101 does accept the credit card (not shown) of Issuer #2 104.

The TCS 100 is contemplated as being a processor 105 driven device or collection of devices, that is configured for processing (e.g. receiving requests for transactional credit, reactivating accounts, approving credit, etc.). The TCS 100 may further be configured for accessing and reading associated computer readable media having stored thereon data/and or computer executable instructions for implementing the various methods of the present invention. In particular, the processor 105 provides the business logic for the TCS 100 that supports and provides an environment for server side logic, expressed as objects, rules and computations, such as determining whether to authorize or deny transactional credit.

Additionally, the TCS 100 may have a telecommunication interface 111, and/or an interactive voice response unit 112, so that the merchant 101, issuer(s) (102 and 104), and cardholder 108 may interact and input menu options using voice, or touch tone commands.

The TCS 100 memory 106 may take the form of any computable readable medium. The memory 106 may be logically and/or physically divided into multiple units. Memory 106 is not meant to be limited to any particular type of storage device or quantity of storage devices operating alone, or in combination. As will be appreciated by a person having ordinary skill in the art, memory 106 can store other data associated with a cardholder 108, such as personal data, transaction history data, deactivated credit card accounts and credit history. The memory 106 stores data and program modules, such as, for example, an operating system ("OS") 113, and a database management system ("DBMS") 114. These and/or other programs may be executed by the TCS 100 to perform the various methods of the present invention.

The TCS 100 may include, or be in communication with, one or more searchable databases. By way of illustration only, the TCS 100 may be in communication with a credit card account database of Issuer #1 107, and a credit card account database of Issuer #2 110. These and/or other databases may also store any other data used or generated by the TCS 100. Those skilled in the art will appreciate that the illustrated database may be physically and/or logically separate from one another.

The TCS 100 may also include input/output ("I/O") interfaces 115 for providing logical connections to various I/O devices, such as a scanner, a mouse, etc. A system administrator may utilize these and other I/O devices to interact with the TCS 100. For example, a system administrator may interact with the TCS 100 to populate and edit the credit card account database of Issuer #1 107, and other program modules. Those skilled in the art will appreciate that the TCS 100 may include alternate and/or additional components, hardware or software.

Thus configured, or similarly configured, the TCS 100 may provide a means for a cardholder 108 to receive transactional credit to complete a financial transaction when the TCS 100 is programmed to interact with a merchant 101, credit card issuers (102 & 104), and a cardholder 108.

While a "financial transaction" will be discussed in the context of a purchase, it is meant to include any purchase or payment where a cardholder 108 may use a credit card to complete a financial transaction, such as paying a utility bill, buying an airline ticket online, etc.

Further, while the invention will be discussed in terms of a cardholder 108 "presenting" a credit card 109 of Issuer #1 102 to a merchant 101 to make a purchase, "presenting" is to be interpreted broadly to include tendering, or attempting to tender, a credit card 109 for payment, as well as communicating any credit card 109 (or credit card account) information to a merchant 101 for the purpose of completing a financial transaction. For example, presenting includes the cardholder 108 asking the merchant 101 "Do you accept the credit card 109 of Issuer Number 1 102?" as well handing the credit card 109 of Issuer Number 1 102 to the merchant 101 to complete a purchase without saying anything. Likewise the term "credit card" should be broadly interpreted to include a credit card account, and information (e.g. credit card account number) identifying a credit card or credit card account of the cardholder 108.

Additionally, the term "merchant" 101 is to be broadly interpreted to include any person, or entity, that accepts payment by credit card.

As described above, the exemplary embodiments of the present application are described with reference to a cardholder 108 of Issuer #1 102, whose credit card 109 is in good standing, but is not accepted by a merchant 101. In a preferred embodiment the merchant 101 requests transactional credit from Issuer #2 104 for the cardholder 108 to complete a single financial transaction.

In an alternate embodiment, Issuer #2 104 reactivates a closed credit card account of Issuer #2 104 for the cardholder 108 that was closed in good standing, to use to complete a purchase. In this embodiment, Issuer #2 104 may initially authorize a revolving credit limit equal to the proposed financial transaction (so that the customer 108 can complete his/her purchase) and issue a new credit card to the customer 108 for future use. This embodiment is to be contrasted to the other transactional credit embodiment(s) where no new revolving credit card account is established for the cardholder 108 with Issuer #2 104 for any future use. When Issuer #2 104 provides transactional credit via a reactivated credit card account, Issuer #2 104 gains a new cardholder 108 that may generate new revenue for Issuer #2 104.

In a preferred embodiment, Issuer #1 102 and Issuer #2 104 will have a reciprocal agreement (not shown), to provide transactional credit for each other's respective cardholder(s) 108. For example, Issuer #2 104 may provide transactional credit to a cardholder 108 of Issuer #1 102 (who is not a cardholder of Issuer #2 104) when the cardholder 108 wants to complete a credit purchase from a merchant 101 who only accepts Issuer #2's 104 credit card, and vice versa. In some cases, a merchant 101 may be a party to the agreement (e.g. when the merchant has a duty to pay a convenience fee, or an additional or greater interchange fee), or may be named as a third party beneficiary to the agreement. For example, Issuer #2 104 may only agree to provide transactional credit for financial transactions at the largest merchants who accept Issuer #1's 102 credit card.

In an alternate embodiment, the agreement may be unilateral (not shown). For example, Issuer #1 102 may agree to pay a convenience fee and/or an interchange fee (or a part thereof) to Issuer #2 104 (or any credit card issuer) for providing transactional credit to a cardholder 108 of Issuer #1 102, when a merchant 101 will not accept the card of Issuer #1 102, but will accept the credit card of Issuer #2 104.

The agreement may contain contractual elements (e.g. offer, acceptance and consideration), as well as conditions under which transactional credit will be provided to the cardholder 108 of the other. For example, a condition to provide transactional credit may include that the cardholder 108 have a credit card of Issuer #1 102 in good standing, that the credit card 109 have an available credit balance equal to or greater than the proposed transaction, etc.

Other conditions may include a limit that is placed on the aggregate number of times transactional credit may be provided by Issuer #2 104 to the cardholder 108, or a limit on the frequency that transactional credit may be provided, or both. For example, providing transactional credit may be limited to a maximum of four times a year, and a maximum of once per quarter. In this way, the cardholder 108 may be influenced to apply for a credit card of Issuer #2 104.

Further, conditions may include the cardholder 108, merchant 101, or Issuer #1 102 agreeing to pay a "convenience fee" to Issuer #2 104, for each occurrence of providing transactional credit. If Issuer #1 102 and Issuer #2 104 have a reciprocal agreement to provide transactional credit to each other's cardholders, they may settle between each other on a regular basis (e.g. daily), with the issuer who has extended the most transactional credit, receiving a net payment of convenience fees and/or interchange fees, as per the issuer's (102 & 104) agreement. In this way, fees may be set-off between the issuers (102 & 104). Settlement is well know by persons having ordinary skill in the art, and so is not described in detail herein.

As will be appreciated by a person having ordinary skill in the art, numerous other terms and conditions may be incorporated into the agreement, depending on the unique circumstances of the parties. For example, if it is contemplated that a cardholder 108 may need transactional credit to complete a purchase in a foreign country, so that the purchase will be denominated in a foreign currency, an exchange rate clause covering this contingency could be included in the transactional credit agreement.

Figure 2:
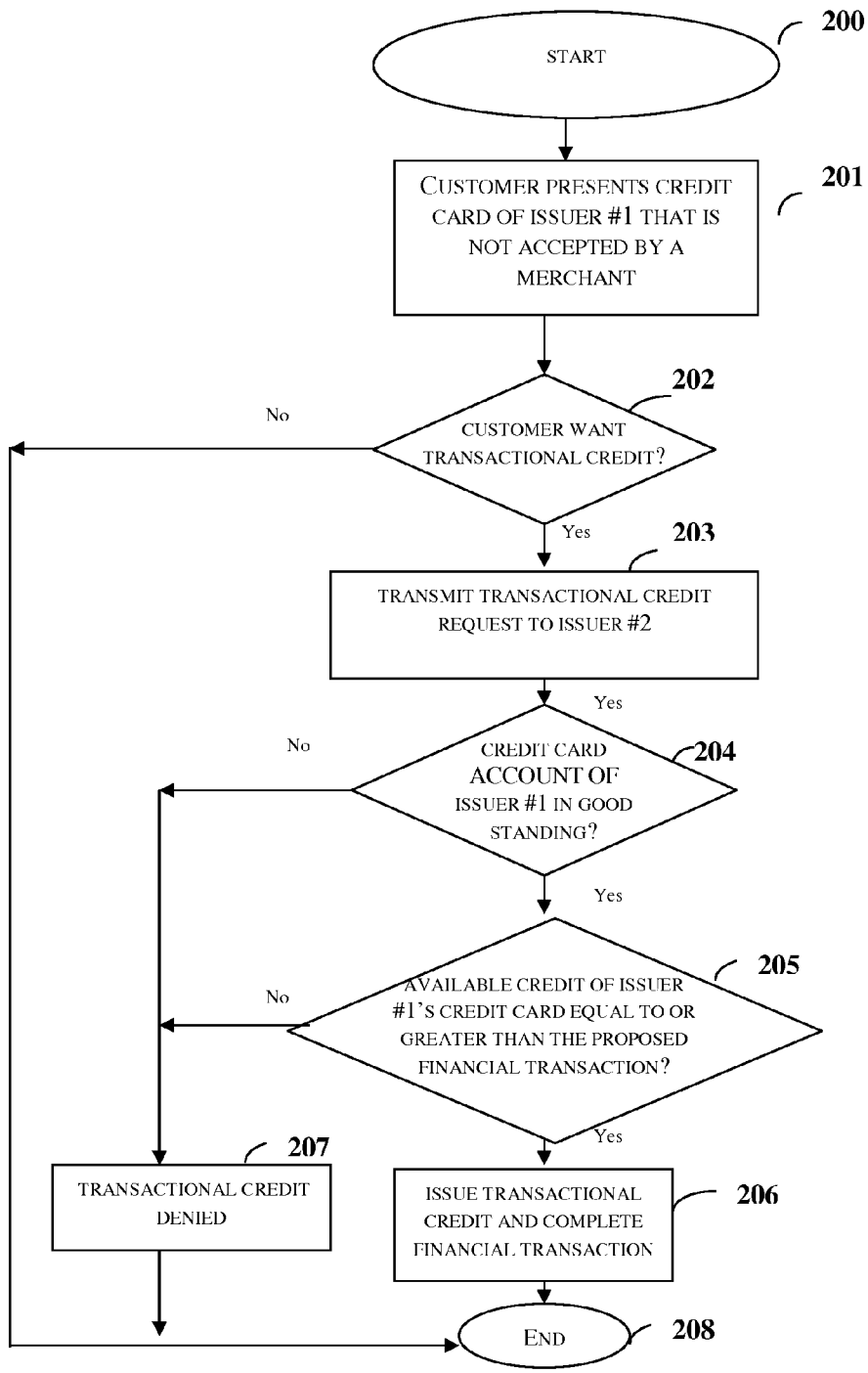
FIG. 2 illustrates an exemplary flow diagram for authorizing transactional credit according to the exemplary embodiments of the present application.

FIG. 2 illustrates an exemplary flow diagram for providing transactional credit according to the exemplary embodiments of the present application. The method starts at step 200, and proceeds to step 201 where a cardholder 108 presents a credit card 109 of Issuer #1 102 to a merchant 101 who does not accept the credit card 109 of Issuer #1 102.

The method proceeds to step 202 where the merchant 101 asks the cardholder 108 if the cardholder 108 would like to request transactional credit from Issuer #2 104, whose credit card the merchant 101 accepts for purchases. If the cardholder 108 responds in the negative, the method proceeds to step 208 and ends.

If the cardholder 108 wants to request transactional credit from Issuer #2 104, the method proceeds to step 203 where a request for transactional credit, as well as information regarding the customer's credit card 109 of Issuer #1 102, is communicated to Issuer #2 104 by the cardholder 108, or the merchant 101. The request may be initiated from a point of sale (POS) device (not shown), phone (not shown), website (not shown), etc., and transmitted to the TCS 100 via the communication link 103. For example, the cardholder 108 may be asked to swipe his credit card 109 of Issuer #1 102 through the POS's magnetic-stripe reader, manually key-in information on the POS, waive the card 109 at the POS (when the credit card 109 and POS are enabled to exchange information via a radio frequency identifier (RFID) chip/reader), answer questions while on a phone, etc. to provide information to the satisfaction of Issuer #2 104, so that Issuer #2 104 may make a determination whether or not to authorize transactional credit for the cardholder 108 of Issuer #1 102.

The transactional credit request may include the cardholder's 108 promise to repay Issuer #2 104 for any transactional credit extended when Issuer #2 104 authorizes transactional credit. In a preferred embodiment, Issuer #2 104 reserves from Issuer #1 102 an amount equal to, or greater than, the amount of transactional credit requested, against the customer's 108 credit card 109 limit of Issuer #1 102 that was presented to the merchant 101.

After requesting transactional credit from Issuer #2 104, the method proceeds to step 204 where it is determined whether the credit card 109 of Issuer #1 102 is in good standing. "Good standing" means that the account is open and that cardholder 108 is making timely minimum payments. In an alternate embodiment, the cardholder 108 may be late by a certain number of days (e.g. 30 days), or has paid late a limited number of times in a given period (e.g. late twice in a 6 month period), and still be in "good standing". In yet another embodiment, a finding of good standing, may require that the cardholder 108 has been paying more than the minimum monthly payment. If the credit card 109 account is not in good standing the method proceeds to step 207 where the transactional credit is denied. The method proceeds to step 208 and ends.

If it is determined that the credit card 109 account of Issuer #1 102 is in good standing, the method proceeds to step 205, where it is determined whether the available credit card 109 balance is equal to, or greater, than the proposed financial transaction. If the credit card's 109 available balance is not at least equal to the proposed transaction, the method proceeds to step 207 where the transactional credit is denied. The method proceeds to step 208 and ends.

If it is determined that the credit card's 109 available credit of Issuer #1 102 is equal to, or greater than the proposed financial transaction, the method proceeds to step 206 where Issuer #2 104 authorizes the transactional credit for the cardholder 108 and sends an approval code to the merchant 101 to complete the purchase. The method proceeds to step 208 and ends.

Figure 3:
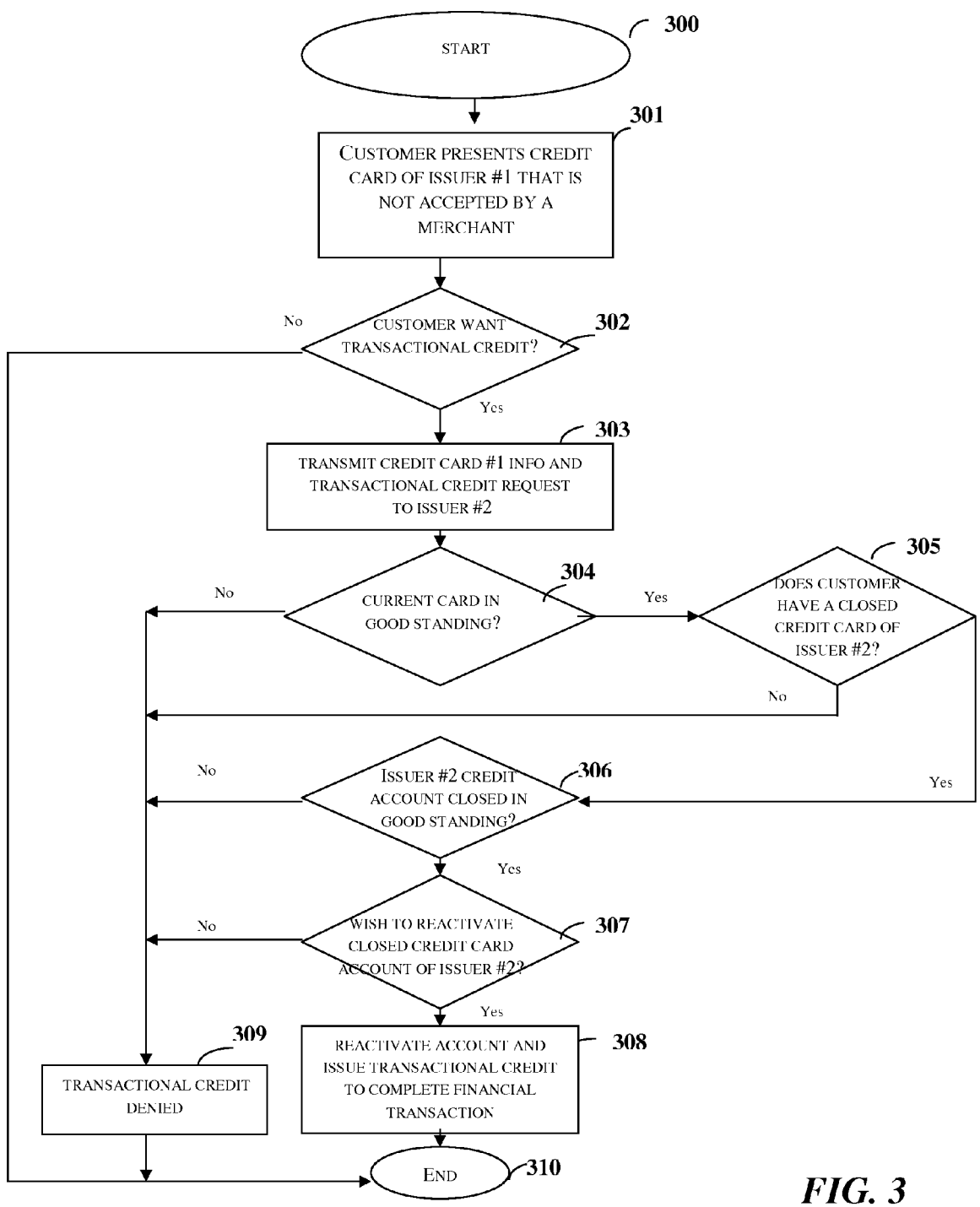
FIG. 3 illustrates an exemplary flow diagram for providing transactional credit, via a reactivated credit card account, according to the exemplary embodiments of the present application.

FIG. 3 illustrates an exemplary flow diagram for providing transactional credit via a reactivated credit card account according to the exemplary embodiments of the present application. The method starts at step 300, and proceeds to step 301 where a cardholder 108 presents a credit card 109 of Issuer #1 102 to a merchant 101 that does not accept the credit card of Issuer #1 102.

The method proceeds to step 302 where the merchant 101 asks the cardholder 108 if the cardholder 108 would like to request transactional credit from Issuer #2 104 (whose credit card the merchant 101 accepts) to complete the customer's 108 financial transaction. If the cardholder 108 responds in the negative, the method proceeds to step 310 and ends.

If the cardholder 108 responds in the affirmative, the method proceeds to step 303, where a transactional credit request is communicated to Issuer #2 104 by the cardholder 108, or the merchant 101 at the customer's 108 request. The request includes cardholder 108 and credit card 109 information of Issuer #1 102. Cardholder 108 information may include personal information (e.g. date of birth) and financial account information (e.g. checking account number) of the cardholder 108. In some embodiments, Issuer #2 104 may request supplemental information from the cardholder 108 and/or the merchant 101 to prevent fraud.

After transmitting a request to Issuer #2 104, the method proceeds to step 304 where it is determined whether the cardholder's 108 credit card 109 account of Issuer #1 102 is in good standing. If it is determined that the cardholder's 108 credit card 109 account of Issuer #1 102 is not in good standing (or necessary information cannot be verified), the method proceeds to step 309 where the credit is denied. The method proceeds to step 310 and ends.

If it is determined that the cardholder's 108 credit card 109 of Issuer #1 102 is in good standing the method proceeds to step 305 where a query to the credit card database of Issuer #2 110 is made to determine whether the cardholder 108 has a closed credit card account of issuer #2 104. If the cardholder 108 does not have a closed credit card account of Issuer #2 104, the method proceeds to step 309 where the credit is denied. The method then proceeds to step 310 and the method ends.

If it is determined that the cardholder 108 has a closed credit card account of Issuer #2 104, the method proceeds to step 306, where it is further determined if the closed credit card account was closed in good standing. "Good standing" includes the account having a zero balance, or a credit balance, when the account was closed. If it is determined that the credit card account was not closed in good standing, the method proceeds to step 309 where the credit is denied. The method then proceeds to step 310 and ends In an alternate embodiment, Issuer #2 104 may additionally require that the closed credit card account of Issuer #2 104 have been closed within a specified "look back" period selected by Issuer #2 104, in relation to the transactional credit request. For example, if the account was closed more than six months prior to the time of the transactional credit request, the request may be denied even if the account was closed in good standing.

If it is determined that the credit card account of Issuer #2 104 was closed in good standing, the method proceeds to step 307 where the cardholder 108 is offered to have the transactional credit granted on the condition that the cardholder 108 agree to have the closed credit card account of Issuer #2 104 reactivated. In this way, the cardholder 108 will be able to complete the financial transaction and Issuer #2 104 regains an account that will potentially generate future revenue. If the cardholder 108 declines reactivation, credit is denied at step 309. The method then proceeds to step 310 and ends.

If the cardholder 108 accepts reactivation of Issuer #2's 104 credit card, the transactional credit is authorized and the transaction is completed. The method proceeds to step 310 and ends.

As may be seen from the foregoing, the present invention provides system and method for providing transactional credit to benefit participating merchants, credit cardholder customers, and issuers. The invention provides a new revenue stream in the form of convenience and/or interchange fees for transactions that may not have otherwise occurred, as well as helping a cardholder complete a financial transaction. The disclosed invention utilizes, among other factors, the cardholder's current credit card as a proxy to measure the credit worthiness of a cardholder to provide transactional credit from a different card issuer with whom the cardholder 108 has not current relationship.

It should be appreciated that the exemplary aspects and features of the present invention as described above are not intended to be interpreted as required or essential elements of the invention, unless explicitly stated as such. It should also be appreciated that the foregoing description of exemplary embodiments was provided by way of illustration only and that many other modifications, features, embodiments and operating environments are possible. Accordingly, the scope of the present invention should be limited only by the claims to follow.

What is claimed is:

1. A method of providing a transactional credit to complete a financial transaction, the method comprising:
    determining, by a transactional credit system, whether a credit card of a first credit card issuer of a customer is in good standing, when a merchant does not accept the credit card of the first issuer;
    requesting the transactional credit, via the transactional credit system, from a second credit card issuer to complete a proposed financial transaction of the customer, wherein the transactional credit includes an amount of credit sufficient to complete the proposed financial transaction, and wherein requesting the transaction credit is in response to determining that the credit card of the first credit card issuer of the customer is in good standing and when the first credit card issuer's credit card is not accepted; and
    authorizing the transactional credit, via the transactional credit system, from the second credit card issuer to complete the proposed financial transaction.

2. The method of claim 1, wherein the customer does not have a credit card of the second credit card issuer.

3. The method of claim 1, comprising the additional step of the customer agreeing to have a closed credit card account of the second credit card issuer reactivated, when it is determined that the customer has a closed credit card account of the second credit card issuer.

4. The method of claim 3, wherein the closed credit account was closed in good standing.

5. The method of claim 3, wherein the account was closed within a look back period selected by the second issuer.

6. The method of claim 1, wherein a limit exists on the number of times transactional credit may be authorized by the second credit card issuer for the customer.

7. The method of claim 1, wherein the first credit card issuer and the second credit card issuer have a reciprocal agreement to provide transactional credit for each other's credit card customers.

8. The method of claim 1, wherein the first credit card issuer has a unilateral agreement to compensate the second credit card issuer for authorizing transactional credit for the first credit card issuer's customer.

9. The method of claim 1, wherein the merchant has no direct contact with the first issuer in requesting transactional credit.

10. The method of claim 1, wherein the request includes one of a group, the group comprising:
   communicating the credit card information of issuer number one to the merchant;
   communicating the credit card information of issuer number one to issuer number two;
   communicating the credit card information of issuer number one to the merchant and to the issuer number two; and
   tendering the credit card of issuer number one to the merchant for payment.

11. A system to provide a transactional credit, the system comprising:
   determining whether a credit card of a first credit card issuer is in good standing, when a merchant does not accept the credit card of the first credit card issuer;
   determining whether a customer has a closed credit card account of a second credit card issuer that was closed in good standing, when a merchant accepts the second issuer's credit card;
   means to request transactional credit from the second credit card issuer, wherein the transactional credit includes an amount of credit sufficient to complete a proposed financial transaction, when the merchant does not accept the first credit card issuer's credit card; and
   means to authorize transactional credit from the second credit card issuer to complete the proposed financial transaction; and
   wherein the second credit card issuer authorizes the transactional credit of the customer under certain conditions which are selected from a group comprising of: the customer having the credit card account of the first credit card issuer in good standing, having an available credit card balance of the first credit card issuer equal to or greater than the proposed financial transaction, and the customer has the closed credit card account of the second issuer.

12. The system of claim 11, wherein the transactional credit includes a fee payable by a group, the group comprising one of a first credit card issuer, a customer, and a merchant.

13. The system of claim 12 wherein the fee may be waived, or offset.

14. The system of claim 11, wherein a limit exists on the number of times the second credit card issuer will authorize transactional credit for a customer.

15. A method of providing a transactional credit via a reactivated credit card account, the method comprising:
   determining, by a transactional credit system, whether a credit card of a first credit card issuer is in good standing and when the merchant does not accept the credit card of the first issuer;
   determining, by the transactional credit system, whether the customer has a closed credit card account of a second credit card issuer that was closed in good standing, when the merchant accepts the second issuer's credit card;
   requesting transactional credit from the second issuer; and
   authorizing, by the transactional credit system, the transactional credit from the second credit card issuer for the customer in the form of the reactivated credit card account of the second credit card issuer, wherein the second credit card issuer authorizes the transactional credit when the customer's credit card of the first issuer is in good standing, and the customer has the closed credit card account of the second issuer that was closed in good standing.

16. The method of claim 15, wherein the credit card account of the second issuer was closed within a look back period selected by the second issuer.

17. The method of claim 15 wherein the authorizing of transactional credit is conditioned upon the customer agreeing to reactivate the closed credit card account of issuer number two.

* * * * *